United States Patent
Chen et al.

(10) Patent No.: US 12,311,774 B2
(45) Date of Patent: May 27, 2025

(54) THERMAL MANAGEMENT METHOD AND SYSTEM, DOMAIN CONTROL UNIT AND STORAGE MEDIUM

(71) Applicant: CONTEMPORARY AMPEREX TECHNOLOGY (HONG KONG) LIMITED, Hong Kong (CN)

(72) Inventors: Xinwei Chen, Ningde (CN); Yiqi Liang, Ningde (CN); Yizhen Hou, Ningde (CN); Zhimin Dan, Ningde (CN); Yu Yan, Ningde (CN); Qidong Lou, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 245 days.

(21) Appl. No.: 17/903,237

(22) Filed: Sep. 6, 2022

(65) Prior Publication Data

US 2023/0127005 A1     Apr. 27, 2023

Related U.S. Application Data

(63) Continuation of application No. PCT/CN2022/094757, filed on May 24, 2022.

(30) Foreign Application Priority Data

Oct. 26, 2021   (CN) .......................... 202111250406.1

(51) Int. Cl.
*B60L 15/20*        (2006.01)
*H01M 10/625*       (2014.01)
(Continued)

(52) U.S. Cl.
CPC ........... *B60L 15/20* (2013.01); *H01M 10/625* (2015.04); *H01M 10/633* (2015.04); *B60L 58/24* (2019.02);
(Continued)

(58) Field of Classification Search
None
See application file for complete search history.

(56) References Cited

U.S. PATENT DOCUMENTS 8,600,598 B2 * 12/2013 Simonini ................ B60L 58/24
                                                701/22
8,996,213 B2 *  3/2015 Ishikawa ............ B60L 15/2045
                                               701/29.6
(Continued)

FOREIGN PATENT DOCUMENTS

CN          103944225 A      7/2014
CN          111769240 A     10/2020
(Continued)

OTHER PUBLICATIONS

Kasiran (2014). Re: How can we calculate the required torque to move a massive object by means of gear assembly? (Year: 2014).*

(Continued)

*Primary Examiner* — Redhwan K Mawari
*Assistant Examiner* — Kai Nmn Wang
(74) *Attorney, Agent, or Firm* — ANOVA LAW GROUP, PLLC (57) ABSTRACT

A thermal management method includes obtaining a predicted temperature including a predicted value of an operating temperature of a target device, and controlling the target device to switch a thermal management according to the predicted temperature mode. The thermal management mode is used to adjust the operating temperature of the target device.

17 Claims, 5 Drawing Sheets

(51) Int. Cl.
  *H01M 10/633* (2014.01)
  *B60L 58/24* (2019.01)
  *H02P 29/60* (2016.01)

(52) U.S. Cl.
  CPC ....... *B60L 2240/12* (2013.01); *B60L 2240/36* (2013.01); *B60L 2240/421* (2013.01); *B60L 2240/423* (2013.01); *B60L 2240/425* (2013.01); *B60L 2240/461* (2013.01); *B60L 2240/463* (2013.01); *B60L 2240/545* (2013.01); *B60L 2240/62* (2013.01); *B60L 2240/64* (2013.01); *B60L 2240/662* (2013.01); *B60L 2240/70* (2013.01); *H01M 2220/20* (2013.01); *H02P 29/60* (2016.02)

(56) References Cited

U.S. PATENT DOCUMENTS

| | | | | |
|---|---|---|---|---|
| 9,587,954 | B2* | 3/2017 | Gusikhin | G06Q 10/06311 |
| 10,829,105 | B2* | 11/2020 | Shin | B60W 20/12 |
| 11,104,233 | B2* | 8/2021 | Schönhuber | B60L 15/2045 |
| 11,465,534 | B2* | 10/2022 | Vizzini | B60L 58/16 |
| 2008/0012535 | A1* | 1/2008 | Takatsuji | H01M 10/486 903/907 |
| 2012/0316712 | A1 | 12/2012 | Simonini et al. | |
| 2016/0020619 | A1 | 1/2016 | Ma et al. | |
| 2016/0167645 | A1* | 6/2016 | Park | B60W 10/06 903/930 |
| 2017/0033417 | A1* | 2/2017 | Basu | F28F 27/00 |
| 2018/0049205 | A1* | 2/2018 | Oyama | H04W 72/0453 |
| 2020/0376927 | A1* | 12/2020 | Rajaie | B60H 1/00764 |
| 2021/0070281 | A1* | 3/2021 | Limbacher | G01C 21/3453 |
| 2021/0155226 | A1* | 5/2021 | Gao | G06F 16/9035 |

FOREIGN PATENT DOCUMENTS

| | | | |
|---|---|---|---|
| CN | 112459890 | A | 3/2021 |
| CN | 112824139 | A | 5/2021 |
| CN | 113415125 | A * | 9/2021 |
| EP | 3771593 | A1 | 2/2021 |
| JP | 863209956 | A | 8/1988 |
| JP | 2021027797 | A | 2/2021 |
| JP | 2021110575 | A | 8/2021 |
| JP | 2022116393 | A | 8/2022 |
| KR | 20170013151 | A | 2/2017 |
| KR | 20190110038 | A | 9/2019 |
| KR | 20190131406 | A | 11/2019 |
| KR | 20190131451 | A | 11/2019 |
| KR | 20200021234 | A | 2/2020 |
| KR | 20210157731 | A | 12/2021 |

OTHER PUBLICATIONS

Openstax (https://openstax.org/books/physics/pages/6-1-angle-of-rotation-and-angular-velocity), (Year: 2020).*

The Engineering ToolBox (https://www.engineeringtoolbox.com/gear-output-torque-speed-horsepower-d_1691.html, https://www.engineeringtoolbox.com/electrical-motor-efficiency-d_655.html, https://www.engineeringtoolbox.com/work-torque-d_1377.html) (Year: 2020).*

Fiori ("Power-based electric vehicle energy consumption model: Model development and validation." Applied Energy 168 (2016):257-268.). (Year: 2016).*

The Japan Patent Office (JPO) Notification of Reasons for Refusal for Application No. 2022-553572 Dec. 19, 2023 12 Pages (including translation).

Korean Intellectual Property Office (KIPO) Written Decision on Registration for Application No. 10-2022-7030496 Feb. 1, 2024 6 Pages (including translation).

Korean Intellectual Property Office (KIPO) Office Action 1 for Application No. 10-2022-7030496 Oct. 5, 2023 9 Pages (including translation).

The European Patent Office (EPO) Extended Search Report for EP Application No. 22758107.1 Jul. 26, 2023 6 Pages.

The World Intellectual Property Organization (WIPO) International Search Report and written opinion for PCT/CN2022/094757 Aug. 26, 2022 10 pages (including English translation).

The China National Intellectual Property Administration (CNIPA) First Office Action for Application No. 202111250406.1 Sep. 7, 2023 17 Pages (including translation).

The China National Intellectual Property Administration (CNIPA) Second review opinion notice for Application No. 202111250406.1 Nov. 14, 2023 10 Pages (including translation).

* cited by examiner

THERMAL MANAGEMENT METHOD AND SYSTEM, DOMAIN CONTROL UNIT AND STORAGE MEDIUM

CROSS-REFERENCE TO RELATED APPLICATIONS

The present application is a continuation of International Application No. PCT/CN2022/094757, filed on May 24, 2022, which claims priority to Chinese Patent Application No. 202111250406.1, entitled "THERMAL MANAGEMENT METHOD AND SYSTEM, DOMAIN CONTROL UNIT AND STORAGE MEDIUM", filed on Oct. 26, 2021, the entire contents of which are incorporated herein by reference.

TECHNICAL FIELD

The present application relates to the technical field of batteries, and in particular, to a thermal management method and system, a domain control unit and a storage medium.

BACKGROUND ART

With the rapid development of new energy vehicles, thermal management technologies of systems such as batteries and motors in the new energy vehicles have also become an important research direction in this field. However, the existing thermal management method and system of the new energy vehicles have higher energy consumption and lower working efficiency, making it difficult to efficiently and reliably adjust and control temperatures of the systems such as batteries and motors.

SUMMARY

The present application provides a thermal management method and system, a domain control unit, and a storage medium, which can reduce the energy consumption of the thermal management system and improve the thermal management efficiency.

According to a first aspect, the present application provides a thermal management method, including: obtaining a predicted temperature, where the predicted temperature includes a predicted value of an operating temperature of a target device; and giving a control instruction according to the predicted temperature, where the control instruction is used to switch a thermal management mode, and the thermal management mode is used to adjust the operating temperature of the target device.

Through the embodiments of the present application, the thermal management method may be implemented, to obtain the predicted value of the operating temperature of the target device that requires thermal management, and switch the thermal management mode of the target device according to the predicted value, so as to heat or cool the target device. According to the embodiments of the present application, characteristics of large inertia and slow temperature transient response of a vehicle thermal management system are utilized, and the predicted temperature of the target device is used to perform the thermal management, which can effectively reduce the energy consumption of the thermal management system, and implement the smoothness of temperature regulation power, thereby improving the thermal management efficiency.

In a possible embodiment, the obtaining a predicted temperature further includes: obtaining a predicted driving route; sending the predicted driving route to a cloud platform, and requesting a road condition parameter of the predicted driving route; and obtaining the predicted temperature according to the road condition parameter of the predicted driving route.

In the foregoing embodiment, the predicted driving route of a vehicle is obtained, the road condition parameter corresponding to the predicted driving route may be obtained through the cloud platform, and the predicted temperature of the target device may be obtained using the road condition parameter corresponding to the predicted driving route. The operating temperature of the target device is predicted according to road condition information of the predicted driving route of the vehicle, so that the predicted temperature of the target device is more accurate, thereby effectively improving the reliability of the predictive thermal management mentioned above.

In a possible embodiment, the obtaining the predicted temperature according to the road condition parameter of the predicted driving route further includes: determining a driving parameter according to the road condition parameter and a first vehicle parameter; determining a predicted heat production value according to the driving parameter, the road condition parameter, and a second vehicle parameter; and obtaining the predicted temperature according to the predicted heat production value, a current temperature of the target device, an ambient temperature, and a third vehicle parameter.

In the foregoing embodiment, the predicted heat production value of the target device is obtained based on the road condition parameter corresponding to the predicted driving route of the vehicle and the vehicle parameters, and the predicted temperature of the target device is obtained based on the predicted heat production value of the target device. Temperature planning of the target device is implemented based on a current state of the vehicle in conjunction with the road condition information of the predicted driving route of the vehicle through a real-time calculation using a model, thereby improving the thermal management efficiency and the vehicle efficiency.

In a possible embodiment, the method further includes: when a vehicle driving route deviates from the predicted driving route, re-obtain a predicted driving route; and update the predicted temperature according to the re-obtained predicted driving route.

In the foregoing embodiment, the predicted driving route is adjusted in time according to a driving state of the vehicle, and then the predicted temperature of the target device is updated in time, to switch the thermal management mode accordingly, which further improves the thermal management efficiency and the reliability of the predictive thermal management.

According to a second aspect, the present application further provides a thermal management system, including: a control unit configured to obtain predicted temperature, where the predicted temperature includes a predicted value of an operating temperature of a target device, and further configured to give a control instruction according to the predicted temperature, where the control instruction is used to switch a thermal management mode, and the thermal management mode is used to adjust the operating temperature of the target device.

In a possible embodiment, the above control unit is further configured to obtain a predicted driving route; and The above thermal management system further includes a communications unit, where the communications unit is configured to send the predicted driving route to a cloud platform, and request a road condition parameter of the predicted driving route.

In a possible embodiment, the above control unit is further configured to: determine a driving parameter according to the road condition parameter and a first vehicle parameter; determine a predicted heat production value according to the driving parameter, the road condition parameter, and a second vehicle parameter; and obtain the predicted temperature according to the predicted heat production value, a current temperature of the target device, an ambient temperature, and a third vehicle parameter.

In a possible embodiment, the above control unit is further configured to: when a vehicle driving route deviates from the predicted driving route, re-obtain a predicted driving route; and update the predicted temperature according to the re-obtained predicted driving route.

According to a third aspect, the present application further provides a domain control unit, including: a processor and a memory, where the memory is configured to store a computer program, and the processor is configured to invoke the computer program to perform the thermal management method in the first aspect or any of the possible implementations in the first aspect.

According to a fourth aspect, the present application provides a readable storage medium configured to store a computer program, where the computer program is configured to perform the method in the first aspect or any of the possible implementations in the first aspect.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

DETAILED DESCRIPTION OF EMBODIMENTS

The implementations of the present application need to be further described in detail below with reference to the accompanying drawings and embodiments. The detailed description of the following embodiments and the drawings are used to illustrate the principle of the present application by way of example, but shall not be used to limit the scope of the present application. In other words, the present application is not limited to the described embodiments.

In the description of the present application, it should be noted that, unless otherwise specified, "a plurality of" means at least two. An orientation or a position relationship indicated by the terms "upper", "lower", "left", "right", "inner", "outer", etc. is merely for convenient and brief description of the present application, rather than indicating or implying that an indicated apparatus or element needs to have a particular orientation or be constructed and operated in a particular orientation, and therefore cannot be construed as limiting the present application. In addition, the terms "first", "second", "third", etc. are merely for the purpose of description, and shall not be construed as indicating or implying relative importance. "Perpendicular" is not necessarily perpendicular in the strict sense, and a range of errors is allowed. "Parallel" is not necessarily parallel in the strict sense, and a range of errors is allowed.

A traction battery of a new energy vehicle on the market is mostly a rechargeable battery, with the most common one being a lithium battery, for example, a lithium ion battery, a lithium ion polymer battery, or the like. A temperature of the battery and the uniformity of a temperature field have a great impact on the performance and service life of the traction battery. If the traction battery works at an extremely low temperature, it may lead to performance deterioration of the battery, and lithium precipitation of the battery during charging, affecting the capacity and service life of the battery. If the traction battery works at an extremely high temperature, it may lead to thermal runaway, which causes certain safety hazards. Since temperatures of a battery, a motor, and a passenger compartment in a vehicle affect the performance and energy consumption of the vehicle, effective thermal management is essential. Currently, a commonly used thermal management system includes a plurality of distributed controllers, and each controller collects real-time temperature signals and performs heating or cooling according to the real-time temperature signals. A battery management system (BMS) is responsible for the thermal management of the battery, and the thermal management of other devices is processed and controlled by a vehicle control unit (VCU). In such a thermal management system, the control modules are scattered, which is not conducive to waste heat recovery, and the thermal system has the disadvantages of complicated component circuit settings, many communication nodes, and large network load. In addition, due to a large inertia of the thermal management system of the vehicle, when thermal management is performed on each device, it takes a certain period of time to make the temperature of the device or system reach an optimal temperature range, the temperature regulation efficiency is not high, and the energy consumption of the system is large.

To resolve the foregoing problems, reduce the energy consumption of the thermal management system, and improve both the efficiency and reliability of the thermal management, embodiments of the present application provide a thermal management method and system, a domain control unit, and a storage medium.

Figure 1:
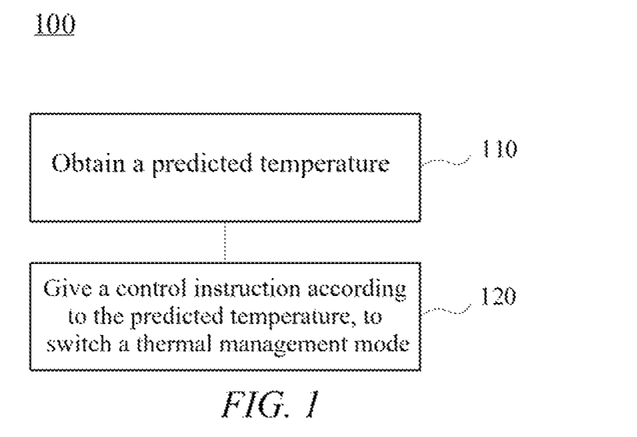
FIG. 1 is a schematic flowchart of a thermal management method according to an embodiment of the present application.

FIG. 1 shows a thermal management method 100 according to an embodiment of the present application, specifically including some or all of the following steps.

Step 110: Obtain a predicted temperature.

The predicted temperature is a predicted value of an operating temperature of a target device, and the target device may be a battery, a motor electronic control system, or another device and system that require thermal management.

Step 120: Give a control instruction according to the predicted temperature, to switch a thermal management mode.

The thermal management mode is used to adjust the operating temperature of the target device. Specifically, a thermal management element or circuit may be controlled according to a heating or cooling requirement of the target device, such that the target device works within a suitable temperature range. For example, the thermal management mode may include: when a motor needs a cooling mode, in this case, the thermal management mode is set as that a water cooling system of the motor starts to work; when a battery needs a cooling mode, in this case, the thermal management mode is set as that a water cooling system of the battery starts to work; and when a motor needs a cooling mode and a battery needs a heating mode, in this case, the thermal management mode is set as that water cooling systems of the motor and the battery work simultaneously, and a coolant of the motor is used to heat the battery.

The predicted value of the operating temperature of the target device is obtained, and the thermal management mode is switched according to the predicted value, so as to heat or cool the target device accordingly. The method may not only optimize a temperature rise curve of the target device, but also implement the smoothness of the temperature regulation power, thereby reducing an aging rate of an insulation system and electrochemical substances, and effectively reducing the energy consumption of the thermal management system by using the predicted value to reasonably regulate and control limited cooling resources, thus making the thermal management system work efficiently and improving the thermal management efficiency.

Figure 2:
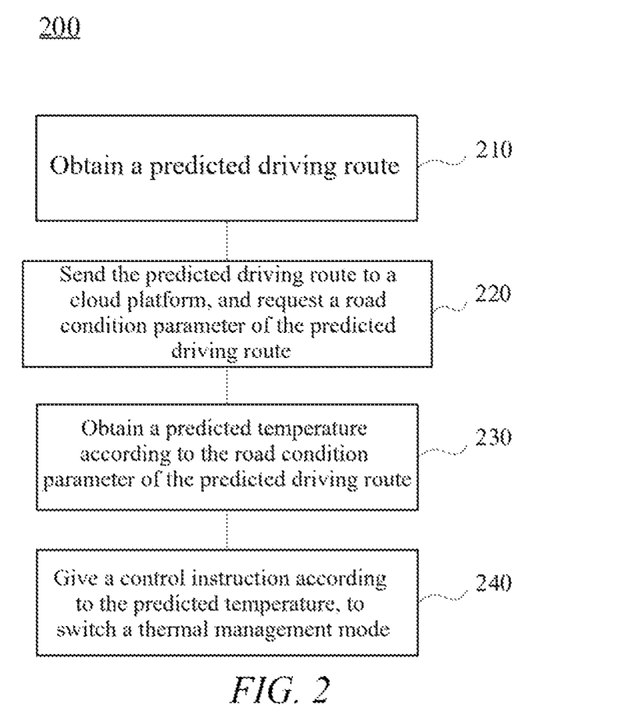
FIG. 2 is a schematic flowchart of another thermal management method according to an embodiment of the present application.

Further, the foregoing embodiment may also be extended to a thermal management method 200 shown in FIG. 2, specifically including some or all of the following steps.

Step 210: Obtain a predicted driving route.

The predicted driving route may be a driving route that is set by a passenger according to a destination.

Optionally, when the passenger does not set the driving route according to the destination, a vehicle driving route within a subsequent specific distance may be predicted according to a current position of the vehicle, and then the route is used as the predicted driving route. Specifically, a plurality of driving routes along which the vehicle may travel within a subsequent specific preset distance may be obtained according to the current position of the vehicle, and the most possible driving route is selected as the predicted driving route according to road condition information provided by a cloud platform; or the most possible driving route is selected as the predicted driving route according to a common route for the vehicle owner that is recorded by the cloud platform. For example, when traveling on an expressway, the vehicle may take a straight driving route or a right-turn driving route. In this case, if the road condition information provided by the cloud platform indicates that most drivers go straight (that is, the traffic flow along the straight driving route is higher), the vehicle most possibly take the straight driving route, and the straight driving route is used as the predicted driving route; and if a common route for the vehicle owner that is recorded by the cloud platform is the right-turn driving route, the right-turn driving route is used as the predicted driving route.

Step 220: Send the predicted driving route to a cloud platform, and request a road condition parameter of the predicted driving route.

Specifically, the road condition parameter of the predicted driving route may be: an average travel speed (excluding a parking phase), an average travel time (excluding a parking phase), and an average parking time. To improve the prediction accuracy, the requested road condition parameter may further include a maximum vehicle speed, maximum acceleration in an acceleration phase of the vehicle, minimum deceleration in a deceleration phase of the vehicle, a travel time ratio, an average number of starts and stops per kilometer, or other parameters that may be collected from big data of the cloud platform.

Step 230: Obtain a predicted temperature according to the road condition parameter of the predicted driving route.

Specifically, the required road condition parameter of the predicted driving route may be obtained according to road condition information of the predicted driving route to obtain a predicted heat production value of a target device, thereby obtaining the predicted temperature of the target device.

Step 240: Give a control instruction according to the predicted temperature, to switch a thermal management mode.

In the foregoing embodiment, a driving state of the vehicle may be obtained by obtaining the predicted driving route of the vehicle, thereby obtaining the predicted temperature. According to the road condition information of the predicted driving route of the vehicle, an operating temperature of the target device is predicted and planned, which effectively improves the reliability of the foregoing predictive thermal management.

Figure 3:
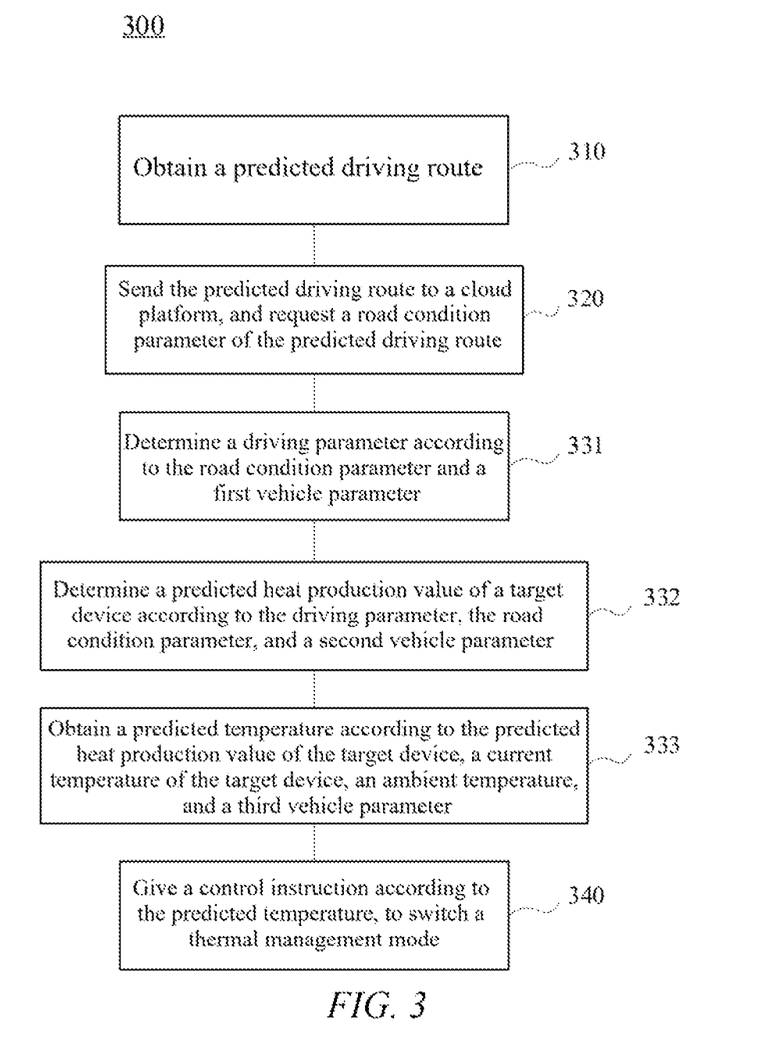
FIG. 3 is a schematic flowchart of still another thermal management method according to an embodiment of the present application.

Optionally, through further optimization, a thermal management method 300 shown in FIG. 3 may be obtained, where step 230 in the foregoing embodiment may be expanded into step 331 to step 333. The thermal management method 300 specifically includes some or all of the following steps.

Step 310: Obtain a predicted driving route.

Step 320: Send the predicted driving route to a cloud platform, and request a road condition parameter of the predicted driving route.

Step 331: Determine a driving parameter according to the road condition parameter and a first vehicle parameter.

The first vehicle parameter includes a vehicle weight, a wind resistance coefficient, a friction coefficient, a transmission loss, or the like. The driving parameter includes mechanical power and electric power of a motor.

Specifically, an output torque and an output speed of the motor may be obtained according to a basic whole vehicle dynamics model in conjunction with the first vehicle parameter and the road condition parameter of the predicted driving route, and the mechanical power and electric power of the motor may be further calculated.

Formulas are as follows:

$$\begin{cases} F_{roll} = fmg\cos\theta \\ F_{aero} = \dfrac{A_f C_d u^2}{21.15} \\ F_{grade} = mg\sin\theta \\ F_{inerita} = \delta m \dfrac{du}{dt} \end{cases}$$

where $F_{roll}$ represents rolling resistance, m represents half-load mass of a vehicle, f represents a rolling resistance coefficient of a wheel, and $\theta$ represents a gradient of a driving road surface; $F_{aero}$ represents air resistance, $A_f$ represents a frontal area, $C_d$ represents an air resistance coefficient, and u represents a driving speed; and $F_{grade}$ represents gradient resistance, $F_{inertia}$ represents acceleration resistance, and $\delta$ represents a rotational mass conversion coefficient.

According to the above formulas, the driving force $F_{trac}$ of the vehicle may be obtained by the formula:

$$F_{trac}=F_{roll}+F_{aero}+F_{grade}+F_{inertia}$$

A relationship between the torque $T_{wheel}$ of the wheel of the vehicle and the driving force of the vehicle and a relationship between the rotational speed $\omega_{wheel}$ and the vehicle speed may be respectively expressed as follows:

$$\begin{cases} T_{wheel} = F_{trac} \cdot r \\ \omega_{wheel} = \dfrac{u}{r} \end{cases}$$

where r represents a wheel radius.

The output torque $T_{MG}$ and output speed $\omega_{MG}$ of the motor may be obtained according to the following formulas:

$$T_{MG} = \dfrac{T_{wheel}}{i_{fd}\eta_{DL}}$$

$$\omega_{MG} = \omega_{wheel} i_{fd}$$

where $i_{fd}$ represents a final drive ratio, and $\eta_{DL}$ represents transmission efficiency of a final drive differential.

Working efficiency $\eta_{MG}$ of the motor is:

$$\eta_{MG}=f_{MG}(T_{MG},\omega_{MG})$$

where $f_{MG}$ represents an efficiency lookup function. Current working efficiency of the motor may be obtained by looking up an efficiency map table.

The mechanical power $P_{MG}$ and electric power $P_e$ of the motor are respectively:

$$P_{MG} = \omega_{MG}T_{MG}$$

$$P_e = \begin{cases} \dfrac{P_{MG}}{\eta_{MG}}, P_{MG} \geq 0 \\ P_{MG}\eta_{MG}, P_{MG} < 0 \end{cases}$$

Step 332: Determine a predicted heat production value of a target device according to the driving parameter, the road condition parameter, and a second vehicle parameter.

The second vehicle parameter includes parameters such as an average current passing through the battery during traveling of the vehicle within a specific period of time, DC internal resistance of the battery, or the like.

The predicted heat production value $Q_3$ of the target device may be obtained by fitting a heat production value $Q_1$ of the target device under a current driving state and an intermediate predicted heat production value $Q_2$.

In other words, the predicted heat production value $Q_3$ of the target device is determined according to the following formula:

$$Q_3=(1-k)Q_1+kQ_2$$

where $Q_1$ represents a heat production value of the target device that is generated when it is assumed that the vehicle maintains the current driving state within a predicted route range; $Q_2$ represents the intermediate predicted heat production value obtained according to the road condition parameter of the predicted driving route; and k represents a correction coefficient ($0 \leq k \leq 1$).

Specifically, for the motor:

$$Q_{m1}=|P_{e1}-P_{MG1}|\times t$$

where $P_{MG1}$ and $P_{e1}$ respectively represent average mechanical power and average electric power of the motor during traveling (non-parking) within a specific period of time, and represents an average travel time (excluding a parking phase).

$$Q_{m2}=|P_{e2}-P_{MG2}|\times t$$

where $P_{e2}$ and $P_{MG2}$ respectively represent electric power and mechanical power of the motor that correspond to the road condition parameter provided by a cloud, and t represents an average travel time (excluding a parking phase).

The predicted heat production value $Q_{m3}$ of the motor is:

$$Q_{m3}=(1-k)Q_{m1}+kQ_{m2}$$

For a battery:

$$Q_{b1}=(I_1)^2 R_1 t$$

$I_1$ represents an average current passing through the battery during driving (non-parking) within a specific period of time, $R_1$ represents DCR of the battery at $I_1$, and t represents an average travel time (excluding a parking phase).

$$Q_{b2}=(I_2)^2 R_2 t$$

$I_2$ represents a current $I_2$ that passes though the battery and corresponds to the road condition parameter provided by a cloud and an average travel speed u (excluding a parking phase), $R_2$ represents DCR of the battery at $I_2$, and t represents an average travel time (excluding a parking phase).

A predicted heat production value $Q_{b3}$ of the battery is:

$$Q_{b3}=(1-k)Q_{b1}+kQ_{b2}$$

Step 333: Obtain a predicted temperature of the target device according to the predicted heat production value of the target device, a current temperature of the target device, an ambient temperature, and a third vehicle parameter.

The third vehicle parameter may include parameters such as a specific heat capacity of a battery, a specific heat capacity of a motor system, heat dissipation power of the battery, and heat dissipation power of a motor.

Specifically, the predicted temperature of the target device may be calculated according to the predicted heat production value of the target device, a heat dissipation value of the target device, and a specific heat capacity of the target device in conjunction with the current temperature of the target device and the ambient temperature that are obtained by sampling. The heat dissipation value of the target device may be calculated according to the heat dissipation power of the target device and the average travel time (excluding a parking phase).

For example, a predicted temperature $T_{bat}$ of the battery is calculated according to the following formulas:

$$Q_{db}=P_{Heat\ dissipation\ power\ of\ the\ battery}\times t$$

$$T_{bat}(Q_{b3}-Q_{db})/C_{bat}+T_{bat1}$$

where $Q_{db}$ represents a heat dissipation value of the battery within the average travel time (excluding a parking phase), $Q_{b3}$ represents a predicted heat production value of the battery, $C_{bat}$ represents a specific heat capacity of the battery, and $T_{bat1}$ represents a current temperature of the battery.

For example, the predicted temperature $T_{mot}$ of the motor is calculated according to the following formulas:

$$Q_{dm} = P_{Heat\ dissipation\ power\ of\ the\ motor} \times t$$

$$T_{mot}(Q_{m3} - Q_{dm})/C_{mot} + T_{mot1}$$

where $Q_{dm}$ represents a heat dissipation value of the motor during the average travel time (excluding a parking phase), $Q_{m3}$ represents a predicted heat production value of the motor, $C_{mot}$ represents a specific heat capacity of the motor, and $T_{mot1}$ represents a current temperature of the motor.

Step 340: Give a control instruction according to the predicted temperature, to switch a thermal management mode.

In the foregoing embodiment, according to the first vehicle parameter, the second vehicle parameter, and the road condition parameter corresponding to the predicted driving route of the vehicle, relevant intermediate data are calculated, the predicted heat production value of the target device is obtained by fitting, and then the predicted temperature of the target device is finally obtained by taking the third vehicle parameter and the temperature obtained by sampling into consideration. The operating temperature of the target device is predicted based on a current driving state of the vehicle in conjunction with the road condition information of the predicted driving route of the vehicle, and the temperature planning of the target device is implemented through a real-time calculation using a model, thereby greatly improving the thermal management efficiency and the vehicle efficiency.

Optionally, when a vehicle driving route deviates from the predicted driving route, a predicted driving route may be re-obtained, and the predicted temperature is updated according to the re-obtained predicted driving route, to switch the thermal management mode. The predicted driving route is adjusted in time according to a driving state of the vehicle, and then the predicted temperature of the target device is updated in time, to switch the thermal management mode accordingly, which further improves the thermal management efficiency and the reliability of the predictive thermal management.

The thermal management method provided in the embodiments of the present application may have two implementations in a specific implementation process, and the two possible implementations will be described and illustrated below with reference to figures.

Figure 4:
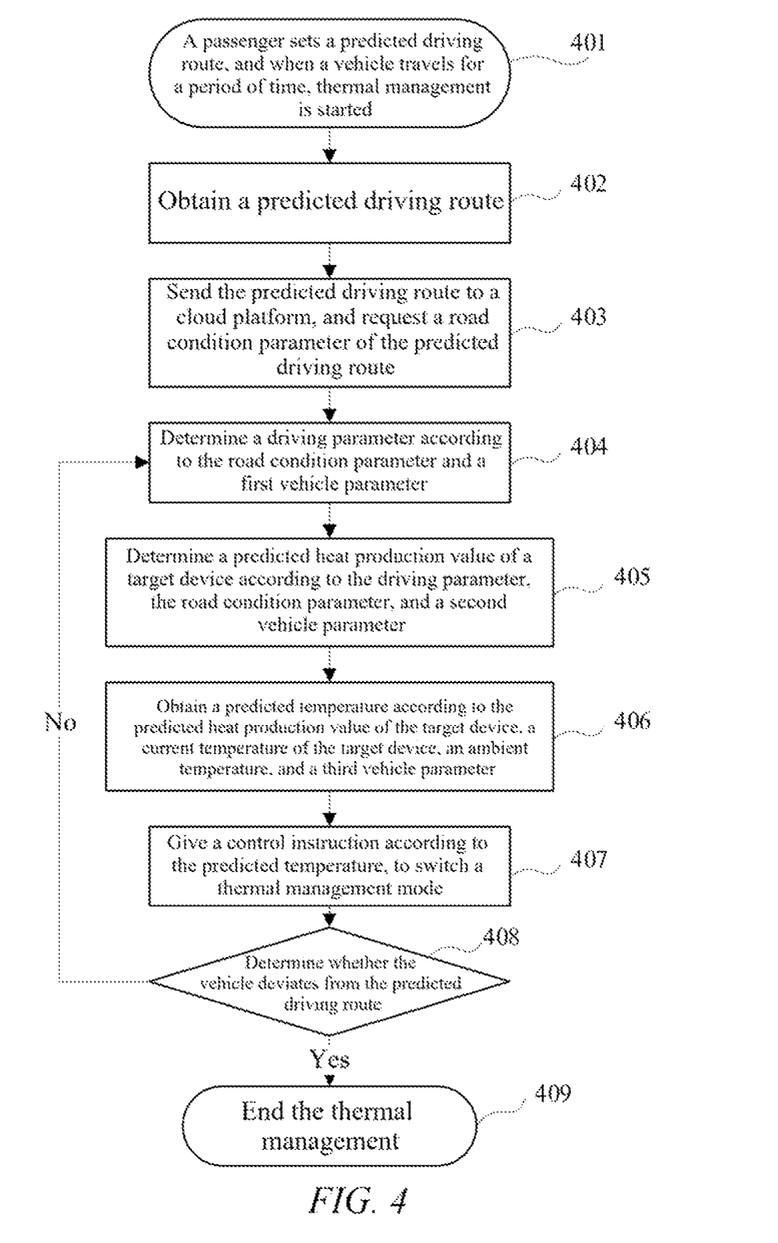
FIG. 4 is a schematic flowchart of a specific implementation of a thermal management method according to an embodiment of the present application.

FIG. 4 is a schematic flowchart of a possible implementation of a thermal management method in the present application. In this implementation, what remains unchanged in this implementation is that a predicted driving route of a vehicle is still selected by a passenger, and the thermal management of a target device is implemented by obtaining a predicted temperature of the target device. For similar steps in FIG. 4, refer to the foregoing embodiments, and for brevity, details are not described herein again.

Step 401: A passenger sets a predicted driving route, and when a vehicle travels for a period of time, thermal management is started.

When the passenger determines a driving destination, the predicted driving route is a driving route set by the passenger according to the destination.

Step 402: Obtain a predicted driving route.

Step 403: Send the predicted driving route to a cloud platform, and request a road condition parameter of the predicted driving route.

Step 404: Determine a driving parameter according to the road condition parameter and a first vehicle parameter.

Step 405: Determine a predicted heat production value of a target device according to the driving parameter, the road condition parameter, and a second vehicle parameter.

Step 406: Obtain a predicted temperature of the target device according to the predicted heat production value of the target device, a current temperature of the target device, an ambient temperature, and a third vehicle parameter.

Step 407: Give a control instruction according to the predicted temperature, to switch a thermal management mode.

Step 408: Determine whether the vehicle deviates from the predicted driving route.

If the vehicle does not arrive at the destination, step 404 is performed, to continue performing thermal management on the target device according to the predicted driving route set by the passenger; and if the vehicle arrives at the destination, step 409 is performed.

Step 409: End the thermal management.

Figure 5:
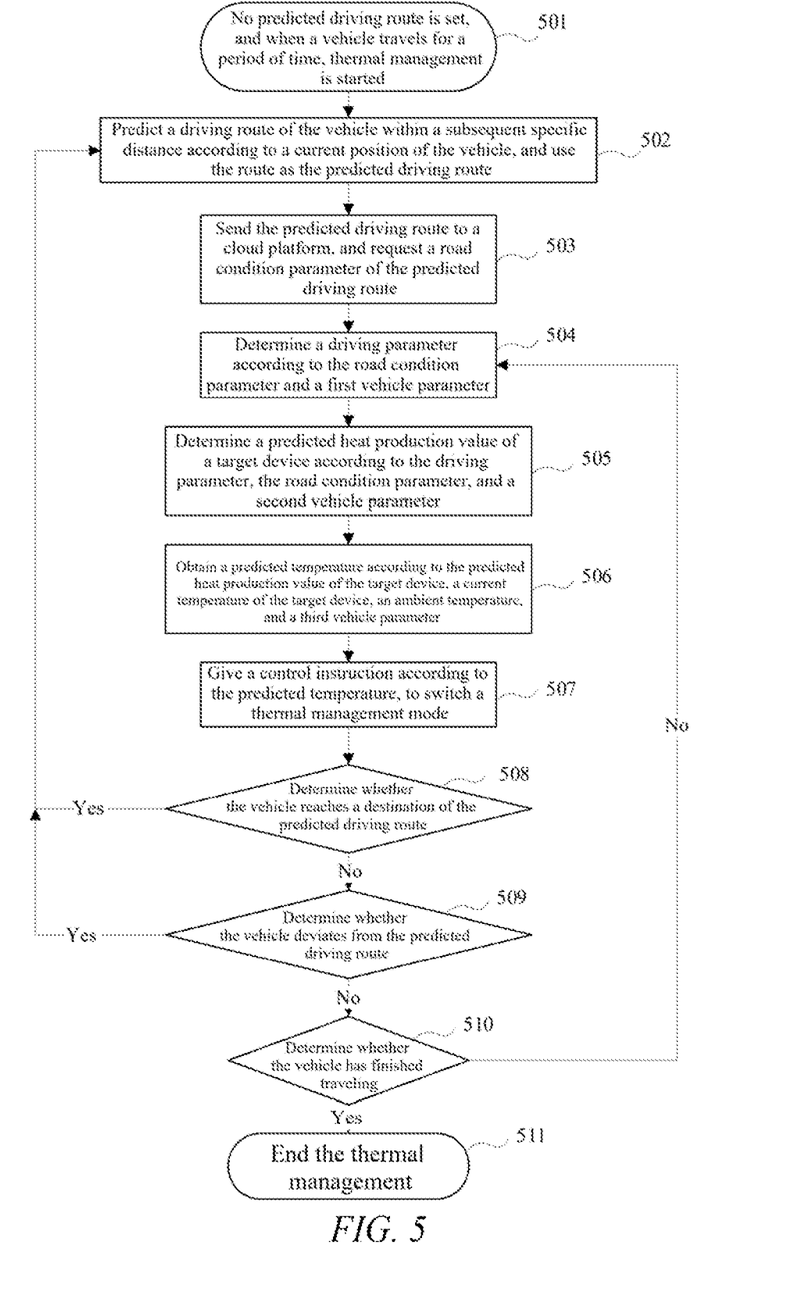
FIG. 5 is a schematic flowchart of another specific implementation of a thermal management method according to an embodiment of the present application.

FIG. 5 is a schematic flowchart of another possible implementation of a thermal management method in the present application. In a case where no predicted driving route of a vehicle is set, the thermal management of a target device may be implemented according to the steps shown in FIG. 5. For similar steps in FIG. 5, refer to the foregoing embodiments, and for brevity, details are not described herein again.

Step 501: No predicted driving route is set, and when a vehicle travels for a period of time, thermal management is started.

Step 502: Predict a driving route of the vehicle within a subsequent specific distance according to a current position of the vehicle, and use the route as the predicted driving route.

When a passenger does not set a driving route according to a destination, a plurality of driving routes along which the vehicle may travel within a subsequent specific preset distance may be obtained, and the most possible driving route is selected as the predicted driving route according to road condition information provided by a cloud platform; or the most possible driving route is selected as the predicted driving route according to a common route for the vehicle owner that is recorded by the cloud platform.

Step 503: Send the predicted driving route to a cloud platform, and request a road condition parameter of the predicted driving route.

Step 504: Determine a driving parameter according to the road condition parameter and a first vehicle parameter.

Step 505: Determine a predicted heat production value of a target device according to the driving parameter, the road condition parameter, and a second vehicle parameter.

Step 507: Give a control instruction according to the predicted temperature, to switch a thermal management mode.

Step 508: Determine whether the vehicle reaches a destination of the predicted driving route.

If the vehicle does not reach the destination of the predicted driving route, step 509 is performed; or if the vehicle reaches the destination of the predicted driving route, step 502 is performed, to re-obtain a current position of the vehicle and a plurality of driving routes along which the vehicle may travel within a subsequent specific distance, the most possible driving route is selected as the predicted driving route, and the predicted temperature and the thermal management mode are updated according to the re-obtained predicted driving route.

Step 509: Determine whether the vehicle deviates from the predicted driving route.

If the vehicle does not deviate from the predicted driving route, step 510 is performed; or if the vehicle deviates from the predicted driving route, step 502 is performed, to re-obtain a current position of the vehicle and a plurality of driving routes along which the vehicle may travel within a subsequent specific distance, the most possible driving route is selected as the predicted driving route, and the predicted temperature and the thermal management mode are updated according to the re-obtained predicted driving route.

Step 510: Determine whether the vehicle has finished traveling.

If the vehicle has not finished traveling, step 504 is performed to continue with thermal management; or if the vehicle has finished traveling, step 511 is performed.

Step 511: End the thermal management.

It may be seen that, according to the embodiments of the present application, the predictive thermal management is performed on the target device under different traveling conditions to meet thermal management of the vehicle under different driving habits, which can optimize a temperature rise curve of the target device, and implement the smoothness of the temperature regulation power, thereby reducing an aging rate of an insulation system and electrochemical substances, reducing the energy consumption of the thermal management system, and improving the thermal management efficiency.

Figure 6:
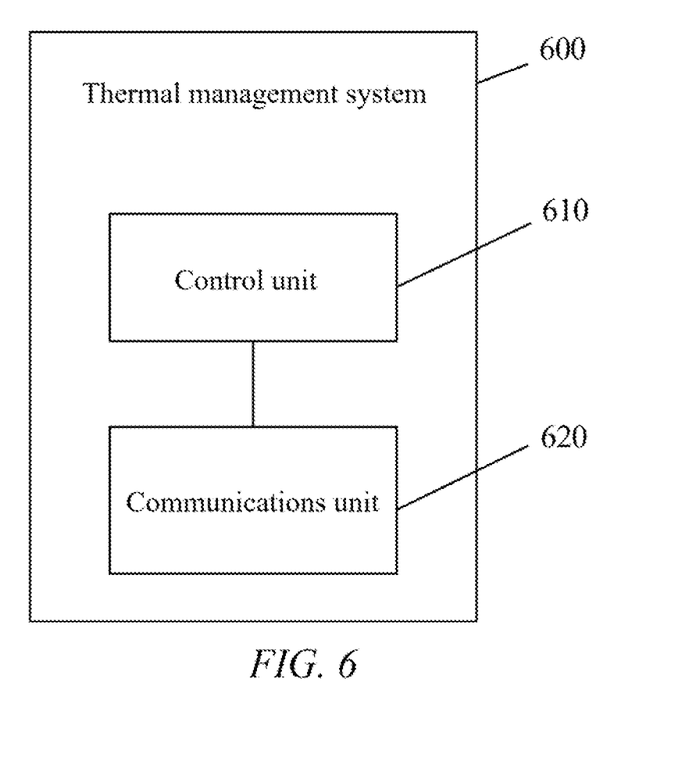
FIG. 6 is a schematic structural diagram of a thermal management system according to an embodiment of the present application.

An embodiment of the present application further provides a thermal management system. As shown in FIG. 6, the system includes: a control unit configured to obtain a predicted temperature, where the predicted temperature includes a predicted value of an operating temperature of a target device, and further configured to give a control instruction according to the predicted temperature, where the control instruction is used to switch a thermal management mode, and the thermal management mode is used to adjust the operating temperature of the target device.

In a possible embodiment, the control unit is further configured to obtain a predicted driving route. The above thermal management system further includes a communications unit, where the communications unit is configured to send the predicted driving route to a cloud platform, and request a road condition parameter of the predicted driving route.

In a possible embodiment, the control unit is further configured to: determine a driving parameter according to the road condition parameter and a first vehicle parameter; determine a predicted heat production value according to the driving parameter, the road condition parameter, and a second vehicle parameter; and obtain the predicted temperature according to the predicted heat production value, a current temperature of the target device, an ambient temperature, and a third vehicle parameter.

In a possible embodiment, the control unit is further configured to: when a vehicle driving route deviates from the predicted driving route, re-obtain a predicted driving route; and update the predicted temperature according to the re-obtained predicted driving route.

An embodiment of the present application further provides a domain control unit, and the domain control unit includes: a processor and a memory, where the memory is configured to store a computer program, and the processor is configured to invoke the computer program to perform the thermal management method in any of the foregoing possible implementations.

Specifically, the domain control unit (DCU) may be configured to: be connected to a compressor, a valve switch, a cooling fan through a hard wire or a signal wire; and be connected to an instrument panel, a motor control unit (MCU), a temperature sensor, and a vehicle-mounted telematics box (TBOX) through a signal wire. Transmission between the vehicle-mounted TBOX and a cloud platform is implemented through wireless signals. When the domain control unit is integrated with a gateway function, the vehicle-mounted TBOX may also be substituted with a wireless signal receiver, where transmission between the wireless signal receiver and the cloud platform is implemented through wireless signals. Each temperature sensor transmits, to the domain control unit, an ambient temperature, a motor temperature, a battery temperature, a passenger compartment temperature, a water temperature at an inlet and outlet of each main valve, a temperature of another power device, and other signals. The cloud platform transmits a road condition parameter signal to the domain control unit via the vehicle-mounted TBOX or wireless signal receiver. After receiving the signal, the domain control unit performs internal processing to determine a thermal management requirement, switch a thermal management working mode, and output a control signal such as a valve switch signal, a cooling fan switch signal, and a signal about a rotational speed of a circulating water pump after calculating a control quantity.

An embodiment of the present application further provides a readable storage medium configured to store a computer program, where the computer program is used to perform the method in the first aspect or any of the possible implementations in the first aspect.

It should be made clear that the present application is not limited to the specific configuration and processing described above and shown in the figures. For brevity, a detailed description of a known method is omitted herein. In the foregoing embodiments, several specific steps are described and shown as examples. However, the method process in the present application is not limited to the specific steps described and shown, and those skilled in the art can make various changes, modifications and additions, or change the sequence between the steps after understanding the spirit of the present application.

The functional blocks shown in the above structural block diagram may be implemented as hardware, software, firmware, or a combination thereof. When the functional blocks are implemented as hardware, the functional blocks may be, for example, an electronic circuit, an application-specific integrated circuit (ASIC), appropriate firmware, a plug-in, or a function card. When the functional blocks are implemented as software, the elements of the present application are programs or code segments used to perform required tasks. The program or code segment may be stored in a machine-readable medium, or transmitted on a transmission medium or a communication link through a data signal carried in a carrier wave. "Machine-readable medium" may include any medium that can store or transmit information. Examples of machine-readable media include an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and so on. The code segment may be downloaded via a computer network such as the Internet, intranet, and so on.

It should also be noted that in the exemplary embodiments mentioned in the present application, some methods or systems are described based on a series of steps or apparatuses. However, the present application is not limited to the sequence of the foregoing steps. In other words, the steps may be performed in the sequence mentioned in the embodiments, or performed in the sequence different from that in the embodiments, or a plurality of steps may be performed simultaneously.

The foregoing describes the aspects of the present application with reference to flowcharts and/or block diagrams of the method, the apparatus, the device, and the computer program product according to the embodiments of the present application. It should be understood that each block in the flowchart and/or block diagram and a combination of blocks in the flowchart and/or block diagram may be implemented by a computer program instruction. These computer program instructions may be provided for a general-purpose computer, a dedicated computer, or a processor of another programmable data processing apparatus to generate a machine, so that when these instructions are executed by the computer or the processor of the another programmable data processing apparatus, specific functions/actions in one or more blocks in the flowcharts and/or in the block diagrams are implemented. The processor may be but is not limited to a general purpose processor, a dedicated processor, a special application processor, or a field programmable logic circuit. It should be further understood that each block in the block diagram or the flowchart and a combination of blocks in the block diagram or the flowchart may be implemented by using dedicated hardware that performs a specified function or operation, or may be implemented by using a combination of dedicated hardware and a computer instruction.

Finally, it should be noted that the foregoing embodiments are merely used to describe the technical solutions of the present application, but are not limited thereto. Although the present application is illustrated in detail with reference to the foregoing embodiments, those of ordinary skill in the art should understand that they can still make modifications to the technical solutions recorded in the foregoing embodiments or make equivalent replacements on some or all of the technical features thereof. These modifications or replacements do not make the essence of the corresponding technical solutions depart from the scope of the technical solutions of the embodiments of the present application, which shall be included in the scope of the claims and description of the present application. Especially, various technical features mentioned in the embodiments may be combined together in any manner as long as there is no structural conflict. The present application is not limited to specific embodiments disclosed herein, but includes all technical solutions that fall within the scope of the claims.

What is claimed is:

1. A thermal management method, comprising:
    determining a predicted temperature, wherein the predicted temperature comprises a predicted value of an operating temperature of a target device, the target device comprising a battery or a motor of a vehicle; and
    controlling, according to the predicted temperature, the target device to switch a thermal management mode, wherein the thermal management mode is used to adjust the operating temperature of the target device;
    wherein determining the predicted temperature comprises:
        obtaining a predicted driving route;
        sending the predicted driving route to a cloud platform, and requesting a road condition parameter of the predicted driving route, the road condition parameter of the predicted driving route comprising at least one of an average parking time, a maximum acceleration, a minimum deceleration, or an average number of starts and stops in a unit distance; and
        determining the predicted temperature according to the road condition parameter of the predicted driving route;
    wherein determining the predicted temperature according to the road condition parameter of the predicted driving route comprises:
        determining a driving parameter according to the road condition parameter and a first vehicle parameter;
        determining a predicted heat production value of the target device according to the driving parameter, the road condition parameter and a second vehicle parameter, comprising:
    determining a first heat production value of the target device under a current driving state;
    determining a second heat production value of the target device according to the road condition parameter of the predicted driving route; and
    determining the predicted heat production value of the target device according to formula:

$Q_3=(1-k)Q_1+kQ_2;$ wherein $Q_3$ represents the predicted heat production value of the target device, $Q_1$ represents the first heat production value of the target device, $Q_2$ represents the second heat production value of the target device, and k represents a correction coefficient, $0 \le k \le 1$'; and
        determining the predicted temperature according to the predicted heat production value of the target device, a current temperature of the target device, an ambient temperature, and a third vehicle parameter; and
    wherein:
        the driving parameter comprises mechanical power and electric power of the motor;
        the first vehicle parameter at least comprises one of a vehicle weight, a wind resistance coefficient, a friction coefficient and a transmission loss;
        the second vehicle parameter at least comprises one of an average current passing through the battery during traveling of the vehicle within a specific period of time, and direct-current internal resistance of the battery; and
        the third vehicle parameter at least comprises one of a specific heat capacity of the battery, a specific heat capacity of the motor, heat dissipation power of the battery, and heat dissipation power of the motor.

2. The method according to claim 1, wherein obtaining the predicted driving route comprises:
    according to a current position of a vehicle, obtaining a plurality of driving routes for the vehicle to travel within a preset distance after the current position; and
    determining, from the plurality of driving routes, the predicted driving route according to road condition information provided by the cloud platform or according to a route for an owner of the vehicle that is recorded by the cloud platform.

3. The method according to claim 1, wherein:
    determining the driving parameter according to the road condition parameter and the first vehicle parameter comprises:
        determining an output torque and an output speed of the motor according to the road condition parameter and the first vehicle parameter; and
        determining the mechanical power according to the output torque and the output speed, and determining the electric power according to the output torque and the output speed.

4. The method according to claim 3, wherein determining the output torque and the output speed of the motor according to the road condition parameter and the first vehicle parameter comprises:
- determining a driving force of the vehicle according to the road condition parameter and the first vehicle parameter;
- determining a torque and a rotational speed of a wheel of the vehicle according to the driving force and a vehicle speed; and
- calculating the output torque and the output speed of the motor according to the torque and the rotational speed of the wheel.

5. The method according to claim 4, wherein determining the torque and the rotational speed of the wheel of the vehicle according to the driving force and the vehicle speed comprises:
- calculating the torque and the rotational speed of the wheel according to formulas:

$$\begin{cases} T_{wheel} = F_{trac} \cdot r \\ \omega_{wheel} = \dfrac{u}{r} \end{cases};$$

wherein $T_{wheel}$ represents the torque of the wheel, $F_{trac}$ represents the driving force of the vehicle and the driving force is calculated according to the road condition parameter and the first vehicle parameter, r represents a radius of the wheel of the vehicle, $\omega_{wheel}$ represents the rotational speed, and u represents the vehicle speed.

6. The method according to claim 5, wherein the driving force is calculated according to following formulas:

$$\begin{cases} F_{roll} = fmg\cos\theta \\ F_{aero} = \dfrac{A_f C_d u^2}{21.15} \\ F_{grade} = mg\sin\theta \\ F_{inertia} = \delta m \dfrac{du}{dt} \end{cases};$$

wherein $F_{roll}$ represents a rolling resistance, m represents a half-load mass of the vehicle, f represents a rolling resistance coefficient of the wheel, $\theta$ represents a gradient of a surface on which the vehicle driving, $F_{aero}$ represents an air resistance, $A_f$ represents a frontal area, $C_d$ represents an air resistance coefficient, u represents the vehicle speed; $F_{grade}$ represents a gradient resistance, $F_{inertia}$ represents an acceleration resistance, and $\delta$ represents a rotational mass conversion coefficient.

7. The method according to claim 4, wherein determining the output torque and the output speed of the motor according to the road condition parameter and the first vehicle parameter comprises:
- calculating the output torque according to a formula:

$$T_{MG} = \dfrac{T_{wheel}}{i_{fd}\eta_{DL}};$$

and
- calculating the output speed according to a formula:
  $\omega_{MG} = \omega_{wheel} i_{fd}$;
- wherein $T_{MG}$ represents the output torque of the motor, $\omega_{MG}$ represents the output speed of the motor, $T_{wheel}$ represents the torque of the wheel, $\omega_{wheel}$ represents the rotational speed of the wheel, $i_{fd}$ represents a final drive ratio, and $\eta_{DL}$ represents a transmission efficiency of a final drive differential.

8. The method according to claim 3, wherein determining the mechanical power according to the output torque and the output speed of the motor, and determining the electric power according to the output torque and the output speed comprises:
- calculating the mechanical power according to a formula: $P_{MG} = \omega_{MG} T_{MG}$, and calculating the electric power according to a formula:

$$P_e = P_{MG}/\eta_{MG}, P_{MG} \geq 0;$$

wherein $P_{MG}$ represents the mechanical power, $P_e$ represents the electric power, $\omega_{MG}$ represents the output speed of the motor, $T_{MG}$ represents the output torque of the motor, and $\eta_{MG}$ represents a working efficiency of the motor.

9. The method according to claim 1, further comprising:
- in response to a vehicle driving route deviates from the predicted driving route, re-obtaining the predicted driving route; and
- updating the predicted temperature according to the re-obtained predicted driving route.

10. A domain control unit, comprising:
- a processor; and
- a memory storing a computer program that, when executed by the processor, causes the processor to execute the thermal management method according to claim 1.

11. The domain control unit according to claim 10, wherein the computer program further causes the processor to:
- according to a current position of a vehicle, obtain a plurality of driving routes for the vehicle to travel within a preset distance after the current position; and
- determine, from the plurality of driving routes, the predicted driving route according to road condition information provided by the cloud platform or according to a route for an owner of the vehicle that is recorded by the cloud platform.

12. The domain control unit according to claim 10, wherein:
- the computer program further causes the processor to:
  - determine an output torque and an output speed of the motor according to the road condition parameter and the first vehicle parameter; and
  - determine the mechanical power according to the output torque and the output speed, and determine the electric power according to the output torque and the output speed.

13. The domain control unit according to claim 12, wherein the computer program further causes the processor to:
- determine a driving force of the vehicle according to the road condition parameter and the first vehicle parameter;
- determine a torque and a rotational speed of a wheel of the vehicle according to the driving force and a vehicle speed; and
- calculate the output torque and the output speed of the motor according to the torque and the rotational speed of the wheel.

14. The domain control unit according to claim 13, wherein the computer program further causes the processor to:
- calculate the torque and the rotational speed of the wheel according to formulas:

$$\begin{cases} T_{wheel} = F_{trac} \cdot r \\ \omega_{wheel} = \dfrac{u}{r} \end{cases};$$

wherein $T_{wheel}$ represents the torque of the wheel, $F_{trac}$ represents the driving force of the vehicle and the driving force is calculated according to the road condition parameter and the first vehicle parameter, r represents a radius of the wheel of the vehicle, $\omega_{wheel}$ represents the rotational speed, and u represents the vehicle speed.

15. The domain control unit according to claim 14, wherein the driving force is calculated according to following formulas:

$$\begin{cases} F_{roll} = fmg\cos\theta \\ F_{aero} = \dfrac{A_f C_d u^2}{21.15} \\ F_{grade} = mg\sin\theta \\ F_{inertia} = \delta m \dfrac{du}{dt} \end{cases},$$

wherein $F_{roll}$ represents a rolling resistance, m represents a half-load mass of the vehicle, f represents a rolling resistance coefficient of the wheel, $\theta$ represents a gradient of a surface on which the vehicle driving, $F_{aero}$ represents an air resistance, $A_f$ represents a frontal area, $C_d$ represents an air resistance coefficient, u represents the vehicle speed; $F_{grade}$ represents a gradient resistance, $F_{inertia}$ represents an acceleration resistance, and $\delta$ represents a rotational mass conversion coefficient.

16. A non-transitory computer-readable storage medium storing a computer program that, when executed by a processor, causes the processor to execute the thermal management method according to claim 1.

17. The method according to claim 1, wherein:

the predicted heat production value of the target device is calculated based on the electrical power of the motor and the mechanical power of the motor corresponding to the road condition parameter provided by the cloud platform, and based on the current passing through the battery corresponding to the road condition parameter and an average travel speed of the predicted driving route provided by the cloud platform.

\* \* \* \* \*